United States Patent
Togami et al.

(10) Patent No.: US 7,333,199 B2
(45) Date of Patent: Feb. 19, 2008

(54) ALIGNING OPTICAL COMPONENTS WITH THREE DEGREES OF TRANSLATIONAL FREEDOM

(75) Inventors: Chris Togami, San Jose, CA (US); Gary Sasser, San Jose, CA (US); Rudolf J. Hofmeister, Sunnyvale, CA (US); Paul K. Rosenberg, Sunnyvale, CA (US); Frank H. Levinson, Singapore (SG); Axel Mehnert, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 437 days.

(21) Appl. No.: 11/125,918

(22) Filed: May 10, 2005

(65) Prior Publication Data

US 2005/0281515 A1 Dec. 22, 2005

Related U.S. Application Data

(60) Provisional application No. 60/569,702, filed on May 10, 2004.

(51) Int. Cl.
*G01B 11/00* (2006.01)
*G02B 6/36* (2006.01)

(52) U.S. Cl. .......................... 356/399; 385/52; 385/53; 385/93; 356/153

(58) Field of Classification Search ................ 356/399, 356/400, 153; 385/88, 90–94, 52, 53, 33
See application file for complete search history.

(56) References Cited

U.S. PATENT DOCUMENTS

| | | | | |
|---|---|---|---|---|
| 5,050,953 A | * | 9/1991 | Anderson et al. | 385/89 |
| 5,631,991 A | * | 5/1997 | Cohen et al. | 385/93 |
| 5,896,481 A | * | 4/1999 | Beranek et al. | 385/90 |
| 6,360,041 B1 | * | 3/2002 | Nakama et al. | 385/37 |
| 6,416,238 B1 | * | 7/2002 | Gilliland et al. | 385/88 |
| 7,056,034 B2 | * | 6/2006 | Togami et al. | 385/88 |
| 7,264,408 B2 | * | 9/2007 | Togami et al. | 385/92 |
| 2003/0044134 A1 | * | 3/2003 | Strachan | 385/93 |
| 2005/0105857 A1 | * | 5/2005 | Ishigami et al. | 385/78 |

\* cited by examiner

*Primary Examiner*—Layla G. Lauchman
(74) *Attorney, Agent, or Firm*—Workman Nydegger

(57) ABSTRACT

The principles of the present invention relate to aligning optical components with three degrees of translational freedom. A lens pin, a lens base, and a molded package are aligned in a first direction, a second direction, and a third direction such that the signal strength of optical signals transferred between a lens included in the lens pin and the molded package is optimized. The lens pin is mechanically coupled to the lens base to fix the position of the lens relative to the molded package in the first direction. Subsequently, the lens base and the molded package are realigned in the second and third directions such that the signal strength is again optimized. The lens base is mechanically coupled to the molded package to fix the position of the lens base relative to the molded package in the second and third directions.

18 Claims, 5 Drawing Sheets

ALIGNING OPTICAL COMPONENTS WITH THREE DEGREES OF TRANSLATIONAL FREEDOM

CROSS-REFERENCE TO RELATED APPLICATIONS

The present invention claims priority to U.S. Provisional Patent Application Ser. No. 60/569,702, entitled "Aligning Optical Components With Three Degrees Of Translational Freedom", filed on May 10, 2004, the entire contents of which are incorporated herein by reference.

BACKGROUND OF THE INVENTION

1. The Field of the Invention

The present invention generally relates to assembling optical components. More specifically, the present invention relates to aligning optical components with three degrees of translational freedom.

2. The Relevant Technology

Because of their high bandwidth and reliable high-speed data transmissions, fiber optic networks are increasingly becoming a popular mode of communication. These high-speed communication networks utilize optical-electronic components such as optical transceivers in transmitting information via the network from a transmission node to a reception node. An optical transceiver at the transmission node receives an electrical signal from a network device, such as a computer, and converts the electrical signal via a laser to an optical signal. The optical signal can then be emitted by a transceiver and transmitted in a fiber optical cable via the optical network, such as a local area network (LAN) backbone, for instance. The optical signal is then received by a reception node of the network. Once received by the reception node, the optical signal is fed to another optical transceiver for conversion via a photo-detector into electrical signals. The electrical signals are then forwarded to a host, such as a computer, for processing. The optical transceivers described above have both signal transmission and reception capabilities; thus, the transmitter portion of the transceiver converts an incoming electrical signal into an optical signal, whereas the receiver portion of the transceiver converts an incoming optical signal into an electrical signal.

Due to the power requirements and optical properties associated with the transfer of light to and from the transceiver to the optical fibers, transceivers should be fabricated with a high degree of accuracy. Accordingly, the active components (e.g., the laser and photo-detector) should typically be aligned within sub-micron accuracy with their respective lenses and optical fibers. Such precision alignment and fabrication is usually actively or manually performed by skilled technicians working with microscopes and high-precision manipulators. Once each optical device is assembled, it may be powered up and tested to verify proper performance and adjustments may be manually made as needed.

In the past, the laser and photo-detector typically resided on separate substrates disposed in a transmitter optical assembly ("TOSA") and receiver optical subassembly ("ROSA"), respectively. Accordingly, the alignment of the laser and photo-detector within a transceiver would take place separately, wherein one component, then the other, is aligned. More recent advancements, however, have simplified transceiver designs by including a single substrate structure that houses the active optical components for both the transmission and reception of optical signals. The single substrate housing is attached to a duplex sleeve assembly that provides ports configured to attach to optical cables.

Although the unification of the TOSA and ROSA to produce a single transmitter/receiver optical assembly ("TROSA") has simplified transceiver design, the unification has increased the stringent requirements for aligning the active components to the respective lenses and fiber optics. For example, because the active components reside on a single substrate they must now be aligned with respect to one another, within micron tolerances. Similarly, the respective lenses within the duplex port assembly must be aligned with respect to one another, and then with respect to the active components when the substrate housing is attached to duplex port assembly. With the added degrees of alignment, as well as the constraints imposed by a single subassembly process (i.e., the attachment of the single substrate housing the active components with the duplex port assembly), the cost in aligning the appropriate components of a transceiver has dramatically increased. Therefore, what would be advantageous are mechanisms for more efficiently aligning optical transceiver components.

BRIEF SUMMARY OF THE INVENTION

The foregoing problems with the prior state of the art are overcome by the principles of the present invention, which are directed to aligning optical components with three degrees of translational freedom. A lens pin, a lens base, and a molded package are aligned in a first direction, a second direction, and a third direction such that the signal strength of optical signals transferred between a lens included in the lens pin and the molded package is optimized. The lens pin is mechanically coupled to the lens base to fix the position of the lens relative to the molded package in the first direction. Subsequent to mechanically coupling the lens pin to the lens base, the lens base and the molded package are realigned in the second and third directions such that the signal strength of optical signals transferred between the lens pin and the molded package is again optimized. The lens base is mechanically coupled to the molded package to fix the position of the lens base relative to the molded package in the second and third directions.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
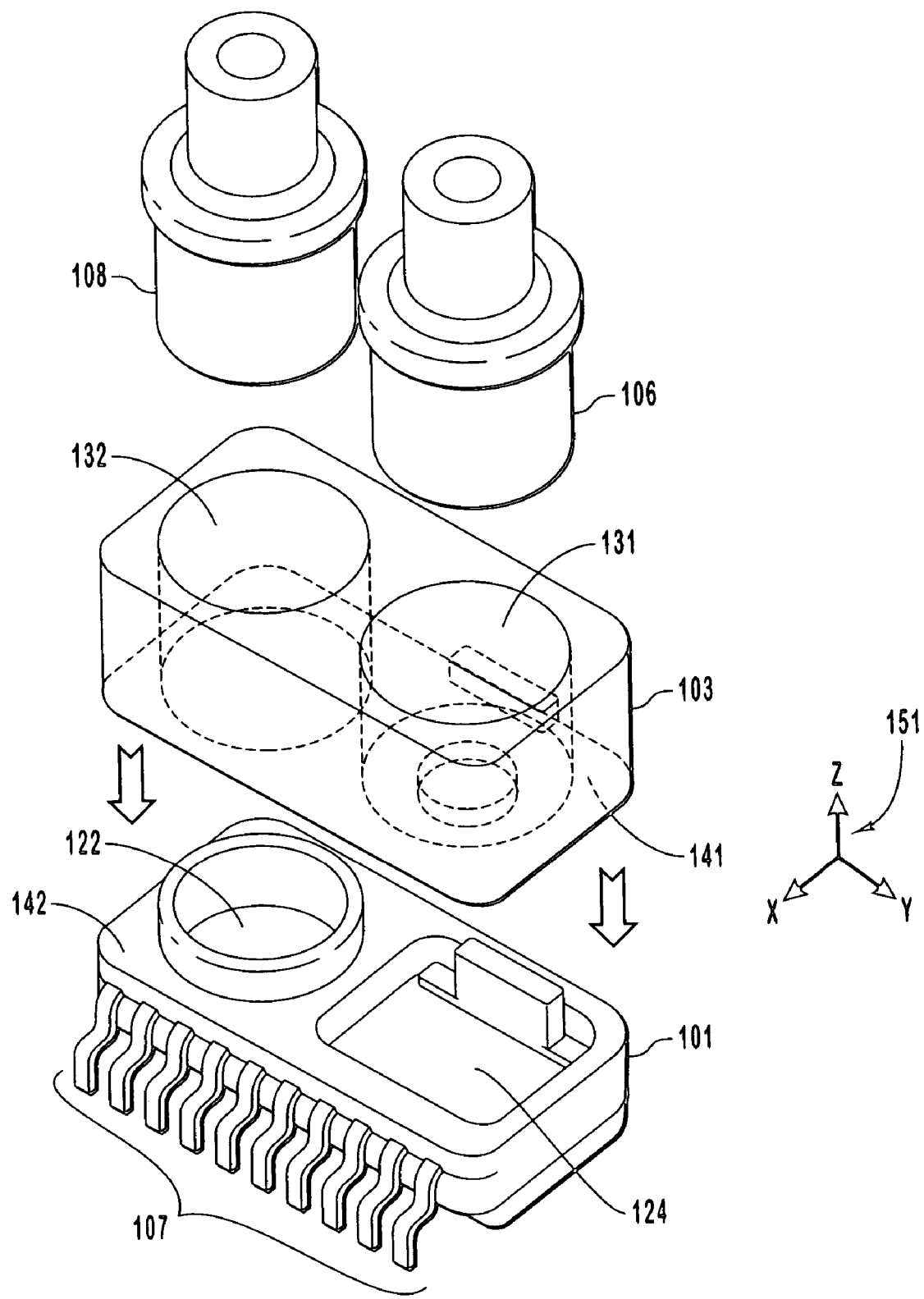
FIG. 1A illustrates components of an example optical device.

The principles of the present invention relate to aligning optical components with three degrees of translational freedom. A lens pin, a lens base, and a molded package are aligned in a first direction, a second direction, and a third direction such that the signal strength of optical signals transferred between a lens included in the lens pin and the molded package is optimzed. The lens pin is mechanically coupled to the lens base to fix the position of the lens relative to the molded package in the first direction. Subsequent to mechanically coupling the lens pin to the lens base, the lens base and the molded package are realigned in the second and third directions such that the signal strength of optical signals transferred between the lens pin and the molded package is again optimized. The lens base is mechanically coupled to the molded package to fix the position of the lens base relative to the molded package in the second and third directions.

In general, embodiments of the present invention comprise modular optical devices (e.g., TOSAs and ROSAs) that can be used with transceiver PC boards that are included in a transceiver module housing. In some embodiments, modular optical devices of the present invention are included within relatively small physical envelopes defined by compact components, such as a Host Bus Adapter ("HBA"). Embodiments of the present invention can interoperate with a desktop computer, a laptop computer, or other similar computer system, while maintaining compliance with applicable operational and performance standards.

As used herein, "OSA" refers to any one of a transmit optical subassembly ("TOSA") or a receive optical subassembly ("ROSA"). Further, a "substrate" refers to a printed circuit board ("PCB") having electrically conductive elements such as circuit traces for transmitting power and/or communication signals between components of a modular optical device and another system or device, such as a computer system. A transceiver PCB can include circuits, devices and systems for facilitating the operation and control of the modular optical device. Such circuits, devices and systems include, but are not limited to, a laser driver, a post amplifier, and transimpedance amplifier. An HBA, configured for connection to components of a computer system (e.g., by inserting the HBA into an available expansion slot), can also include similar circuits.

Embodiments of the present invention include a lens block that is configured such that one or more lens pins can mechanically couple to the lens block and such that the lens block can mechanically couple to a molded package. Accordingly, a modular optical device can include a lens block, a molded package, and one or more lens pins.

The molded package can include a light source (e.g., a vertical cavity surface emitter laser ("VCSEL")) and/or light detector (e.g., photodiode) as well as corresponding openings for transmitting and receiving optical signals. The molded package can also include a connector portion for connecting the molded package to a PCB or HBA. For example, the molded package can include a lead frame having a thru hole pin configuration for connecting to thru holes, a lead frame having a formed configuration for direct connection (e.g., surface mounting), or a flex circuit. Thus, a PCB or HBA can be part of an electronic circuit designed to include active and/or passive circuitry components for driving the light source (e.g., a laser driver), converting a received light signal (e.g., transimpedance amplifier), or for implementing other optical signal processing.

Configurations of the lens block can include receptacles from receiving one or more lens pins. For example, a transmission lens pin, a reception lens pin, or a combination of transmission lens pins and/or reception lens pins can be mechanically coupled to the lens block. Lens pins mechanically coupled to the lens block can provide appropriate receptacles for receiving external optical connections. Lens pins can include lenses that focus optical signals.

Accordingly, a lens included in a (transmission) lens pin can direct a generated optical signal from the molded package to an external component (e.g., an optical cable). On the other hand, a lens included in a (reception) lens pin can direct a received optical signal from an external component to the molded package. For example, an optical signal generated at a laser included in the molded package can be transferred through the lens block, transferred through a lens in a corresponding transmission lens pin, to a corresponding optical cable. Likewise, an optical signal received from an optical cable can be transferred through a lens in a corresponding reception lens pin, transferred through the lens block, into a corresponding photodiode in the molded package.

Referring now to FIG. 1A, FIG. 1A illustrates components of an example modular optical device. Generally, components similar to those in FIG. 1A can be used in modular optical devices of various form factors, including, but not limited to, an SFF, SFP, and XFP optical transceiver. The foregoing are exemplary however, and modular optical devices can be implemented in various other forms as well. Further, embodiments of the invention are suitable for use in connection with a variety of data rates such as about 1 Gbps, about 2 Gbps, about 4 Gbps, and about 10 Gbps, or higher.

The components in FIG. 1A are depicted within a three dimensional Cartesian coordinate space 151 that represents spatial relationships relative to three perpendicular axes X, Y, and Z. However, virtually any coordinate system for representing three dimensional spatial relationships, such as, for example, a coordinate system that utilizes one or more polar coordinates (e.g., φ, θ, and/or r), can be used.

FIG. 1A depicts lens pins 106 and 108 (cylindrical lens pins), lens block 103, and molded package 101. Each of the lens pins 106 and 108 can include a lens for focusing and/or directing an optical signal. For example, lens pin 108 can include a transmission (or TX) lens and lens pin 106 can include a reception (or RX) lens.

Lens block 103 can be a molded plastic with receptacles for receiving lens pins. As depicted, lens block 103 includes (cylindrical) receptacles 132 and 131 for mechanically coupling to a transmission lens pin and a reception lens pin respectively. Thus, for example, lens pin 108 can be slidably inserted into receptacle 132 and lens pin 106 can be slidably inserted in receptacle 131. Accordingly, lens block 103 facilitates both transmitting and receiving an optical signal. Lens block 103 can be molded from plastic, metal, or any other suitable material that will allow for alignment of lens block 103 relative to other optical components.

Molded package 101 includes transmission opening 122 for transmitting generated optical signals and detector opening 124 for detecting received optical signals. Molded package 101 can also include a formed lead frame 107 for connecting molded package 101 (both electrically and mechanically) to a PCB or HBA. For example, formed lead frame 107 can be used to surface mount molded package 101 to a PCB. Molded package 101 can be molded from plastic, metal, or any other suitable material that will allow for alignment of molded package 101 relative to other optical components.

Lens pins 106 and 108 can be slip fit into receptacles 131 and 132 respectively to facilitate directing optical signals between components of molded package 101 and corresponding external components (e.g., optical cable). Lens block 103 can be fit onto (e.g., placed flush against) molded package 101. Lens block 103 and molded package 101 can be held together using a variety of attachment means, such as, for example, adhesive, metal clips, staples, laser welding, barbed pin, etc. Laser welding can be particularly advantageous when lens block 103 and molded package 101 are made of similar plastic compounds. Lens pins (e.g., lens pins 108 and 106) can be held to lens block 103 using similar means.

Figure 1B:
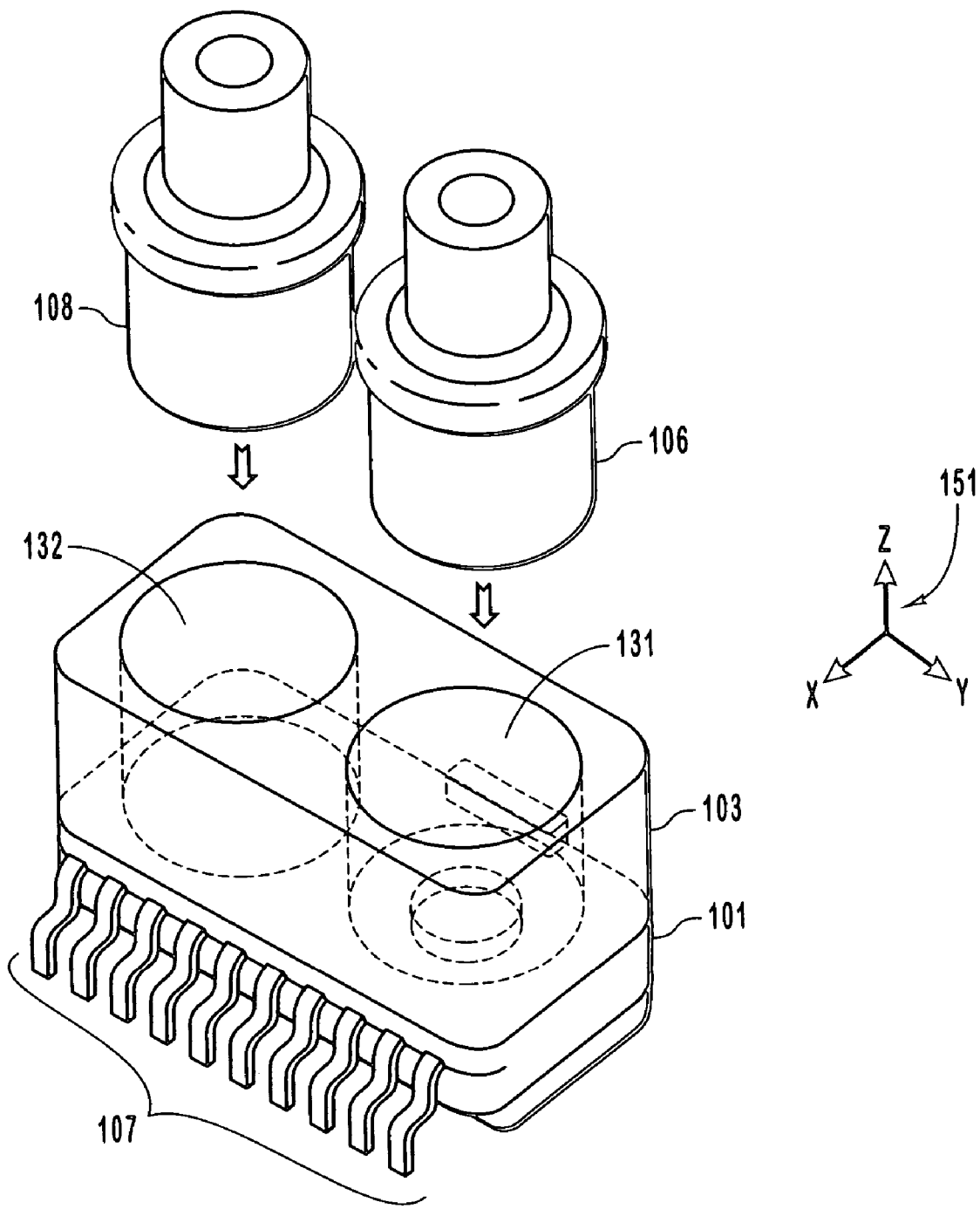
FIG. 1B illustrates components of the example optical device with a lens base and a molded package being held together.
Figure 1C:
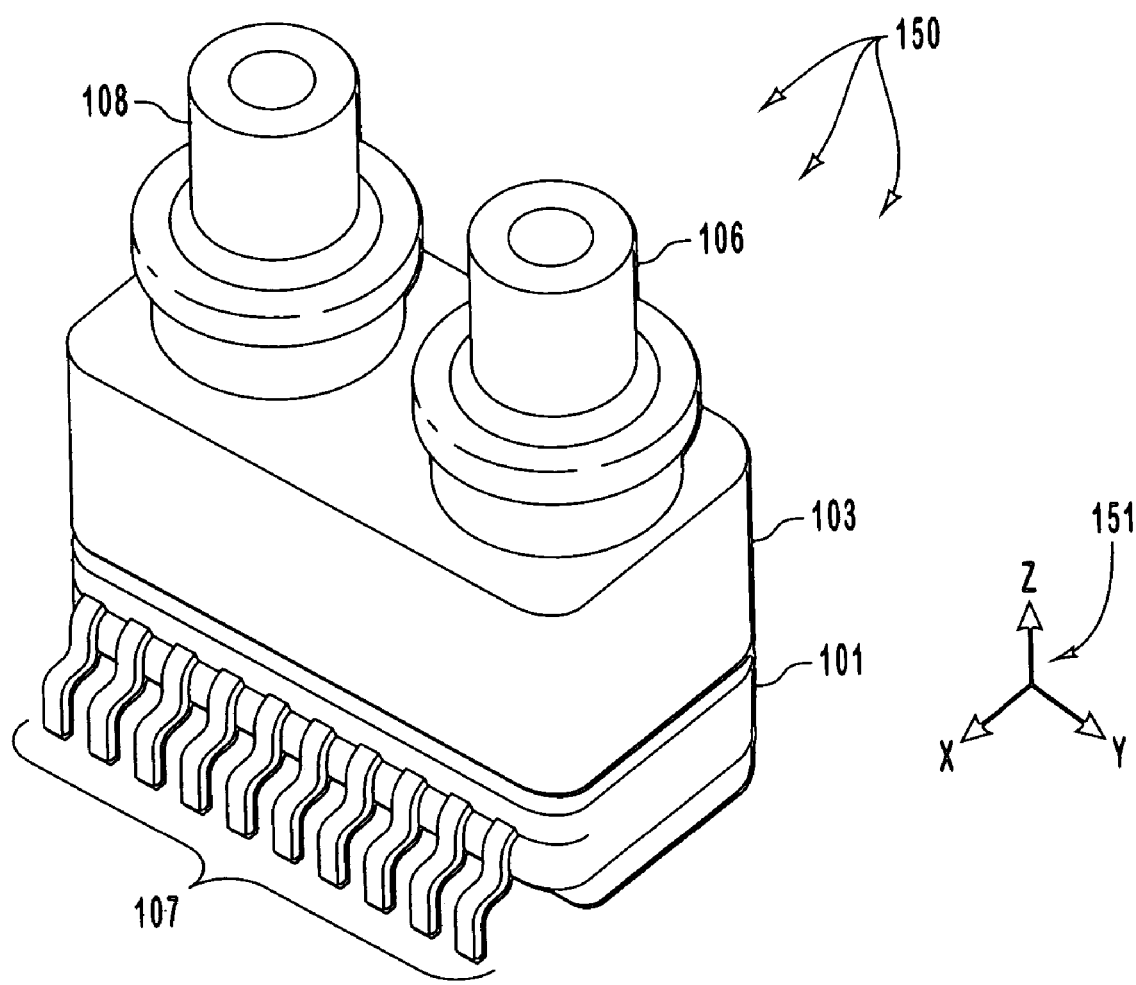
FIG. 1C illustrates components of the example optical device with a lens base and a molded package being held together and with lens pins slid into receptacles of the lens base.

To configure components for alignment, lens block 103 can be placed flush against and lightly held to molded package 101 as depicted in FIG. 1B. For example, surface 141 can be placed in contact with surface 142. Further, lens pins 108 and 106 can be slip fit into and lightly held in receptacles 132 and 131 respectively as depicted in FIG. 1C. Tooling can be used to place lens block 103 flush against molded package 101 and lightly hold lens block 103 to molded package 101. Similarly, tooling can be used to slip fit lens pins 108 and 106 into receptacles 132 and 131 and lightly hold lens pins 108 and 106 in receptacles 131 and 131.

Figure 3:
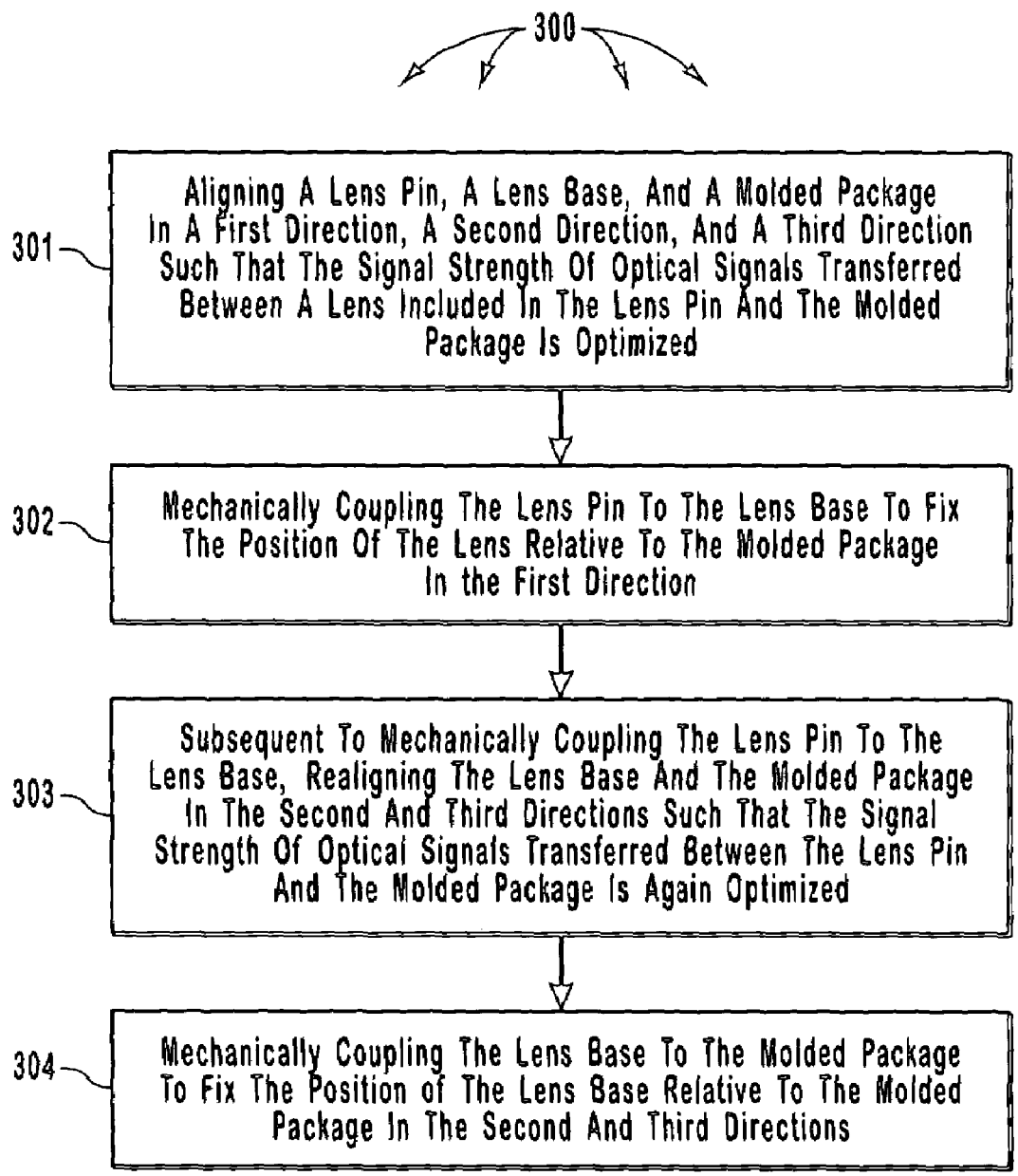
FIG. 3 illustrates an example flowchart of a method for optical component alignment with three degrees of translation freedom.

FIG. 3 illustrates an example flowchart of a method 300 for aligning optical components with three degrees of translation freedom. The method 300 will be described with respect to components in FIGS. 1A, 1B, and 1C. The method 300 includes an act of aligning a lens pin, a lens base, and a molded package in a first direction, a second direction, and a third direction such that the signal strength of optical signals transferred between a lens included in the lens pin and the molded package is optimized (act 301). For example, in FIG. 1C, lens pin 108, lens block 103, and molded package 101 can be aligned in the Z, Y and X axes respectively to optimize the signal strength of optical signals transmitted out of transmission opening 122 (which is not visible in FIG. 1C since lens block 103 is placed flush against molded package 101).

In some embodiments, optimizing signal strength includes aligning components such that the output signal strength is maximized. In other embodiments, optimizing signal strength includes aligning components such that the output signal strength closely approximates a pre-selected signal strength (e.g., that is some amount less than the maximum possible output signal strength). Optimizing signal strength to a pre-selected level can include determining the alignment that maximizes signal strength and then "backing off" from the maximum by a fixed amount in a controlled manner.

Further, output signal optimization of different assembled components can differ. For example, lens pin 108, lens block 103, and molded package 101 can be aligned in the Z, Y and X axes respectively to optimize signal strength to a pre-selected level. Subsequently, lens block 103 and molded package 101 can be realigned, after coupling of lens pin 108 to lens block 103, to maximize signal strength. It would be apparent to one skilled in the art, after having reviewed this description, that other combinations of optimizations are possible.

Tooling used to lightly hold lens pin 108, lens block 103, and molded package 101 together can also move lens pin 108, lens block 103, and molded package 101 (in the X, Y and Z dimensions) relative to one another to facilitate alignment. Signal strength of a transmitted optical signal can be measured by a measuring device connected to the open end of lens pin 108 (the end that is not slip fit into lens block 103). The measuring device can be continually connected to lens pin 108 as lens pin 108, lens block 103, and molded package 101 are moved relative to one another.

Similarly, and when appropriate, lens pin 106, lens block 103, and molded package 101 can be aligned in the Z, Y and X axes respectively to optimize the signal strength of optical signals received at detector opening 124 (which is also not visible in FIG. 1C since lens block 103 is placed flush against molded package 101). However, it may be that once lens pin 108 is aligned along the X and Y axes, lens pin 106 can only be aligned along the Z axis, since any movements to align lens pin 106 along the X and Y axes can adversely affect previous alignment of lens pin 108 relative to molded package 101. In some embodiments, the alignment of lens pin 106 has a wider tolerance range than the alignment of lens pin 108 due to the configuration of the optical components included in molded package 101. For example, the photo-sensitive areas of photo detectors are comparatively larger than the emission areas of laser diodes. Thus, comparatively wider tolerances may be permissible for photo detectors.

The method 300 includes an act of mechanically coupling the lens pin to the lens base to fix the position of the lens relative to the molded package in the first direction (act 302). When positions of lens pin 108, lens block 103, and molded package 101 result in optimized signal strength, tooling can hold lens pin 108, lens block 103, and molded package 101 in those positions. Lens pin 108 can be mechanically coupled to lens base 103 to fix the position of a transmission lens (included in lens pin 108) relative to transmission opening 122 along the Z axis. Likewise, lens pin 106 can be mechanically coupled to lens base 103 to fix the position of a reception lens (included in lens pin 106) relative to detector opening 124 along the Z axis. In some embodiments, laser welding or ultraviolet curing adhesive (e.g., epoxy) is used to mechanically couple a lens pin to a lens block. For example, lens pin 108 can be laser welded to lens block 103 to more permanently hold the position of lens pin 108 relative to transmission opening 122.

The method 300 includes subsequent to mechanically coupling the lens pin to the lens base, an act of realigning the lens base and the molded package in the second and third directions such that the signal strength of optical signals transferred between the lens pin and the molded package is again optimized (act 303). For example, lens base 103 and molded package 101 can be realigned along the X and Y axes after position of lens pin 108 is fixed along the Z axis.

Laser welding or curing of ultraviolet curing adhesive to fix lens pin 108 can cause thermal movement between lens base 103 and molded packed 101. Re-aligning lens base 103 and molded package 101 along the X and Y axes can mitigate the effects of thermal movement. The measuring device can be connected to the open end of lens pin 108 (the end that is not slip fit into lens block 103), while tooling repositions lens base 103 and molded package 101 relative to one another. When optimized signal strength is detected, tooling can lightly hold lens block 103 (and thus mechanically coupled lens pin 108) and molded package 101 in the positions that result in optimum signal strength.

The method 300 includes an act of mechanically coupling the lens base to the molded package to fix the position of the lens base relative to the molded package in the second and third directions (act 304). For example, lens base 103 can be mechanically coupled to molded package 101 to fix the position of lens base 103 relative to molded package 101 along the X and Y axes. In some embodiments, laser welding or ultraviolet curing adhesive is used to mechanically couple a lens block to a molded package. For example, lens base 103 can be laser welded to molded package 101 to more permanently hold the position of lens base 103 relative to molded package 101.

As depicted in FIG. 1C, modular optical device 150 (e.g., an OSA) can result from mechanically coupling and appropriately aligning lens pins 108 and 106, lens base 103, and molded package 101 to one another such that optical signal strength is optimized. Modular optical device 150 can be mechanically and/or electrically coupled to other components, such as, for example, a PCB of a HBA.

Figure 2:
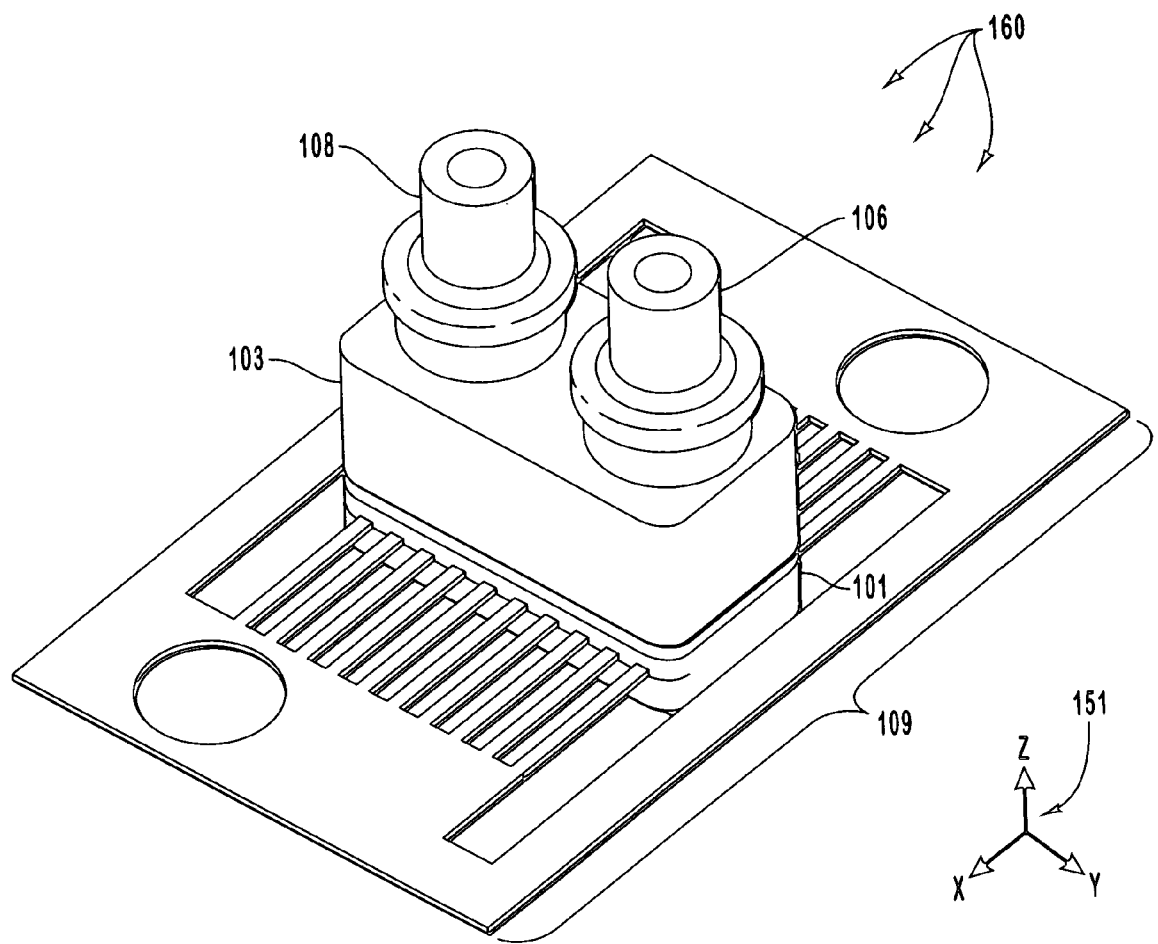
FIG. 2 illustrates components of a second example optical device with a lens base and a molded package being held together and with lens pins slid into receptacles of the lens base.

FIG. 2 illustrates a second example of a modular optical device 160 with flat lead frame 109. Components similar to the components of module optical device 150 can be used to assemble modular optical device 160 (e.g., an OSA). That is, lens pins 106 and 108 are aligned and mechanically coupled to lens block 103 and lens block 103 is aligned and mechanically coupled to molded package 101. In FIG. 2, flat lead frame 109 facilitates electrical connections to other components (e.g., of a HBA). Method 300 can be used to align the components depicted in FIG. 2.

Embodiments of the present invention facilitate more efficient alignment of optical components. For example, implementations of the present invention can appropriately align and assembly OSAs in a reduced amount of time (e.g., 30 seconds). When implemented in an automated manner, for example, using an assembly device with appropriate tooling, upwards of 120 units per hour can be aligned and assembled.

In some embodiments, a (a computerized or otherwise automated) component assembly system is programmed with instructions for implementing method 300. Instructions can be stored on computer-readable media, such as, for example, volatile (random access memory ("RAM")) or non-volatile memory (e.g., magnetic or optical disks), accessible to the component assembly system. When executed (e.g., by a processor), the instructions can cause tooling included in the component assembly system to (potentially repeatedly) perform method 300.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for assembling optical components, the method comprising:
   an act of aligning a lens pin, a lens base, and a molded package in a first direction, a second direction, and a third direction such that the signal strength of optical signals transferred between a lens included in the lens pin and the molded package is optimized;
   an act of mechanically coupling the lens pin to the lens base to fix the position of the lens relative to the molded package in the first direction;
   subsequent to mechanically coupling the lens pin to the lens base, an act of re-aligning the lens base and the molded package in the second and third directions such that the signal strength of optical signals transferred between the lens and the molded package is again optimized; and
   an act of mechanically coupling the lens base to the molded package to fix the position of the lens base relative to the molded package in the second and third directions.

2. The method as recited in claim 1, wherein the act of aligning a lens pin, a lens base, and a molded package comprises an act of aligning the lens pin, the lens base, and the molded package in each dimension of a three dimensional coordinate system.

3. The method as recited in claim 1, wherein the act of aligning a lens pin, a lens base, and a molded package comprises an act of aligning a transmit lens pin, the lens base, and a laser in the molded package.

4. The method as recited in claim 1, wherein the act of aligning a lens pin, a lens base, and a molded package comprises aligning a receive lens pin, the lens base, and a photo detector included in the molded package.

5. The method as recited in claim 1, wherein the act of mechanically coupling the lens pin to the lens base to fix the position of the lens relative to the molded package in the first direction comprises an act of mechanically coupling the lens pin such that the optical signal strength generated by a laser within the molded package is maximized.

6. The method as recited in claim 1, wherein the act of mechanically coupling the lens pin to the lens base comprises fixing the position of lens in one dimension of a three dimensional coordinate system.

7. The method as recited in claim 1, wherein the act of mechanically coupling the lens pin to the lens base comprises an act of laser welding the lens pin to the lens base.

8. The method as recited in claim 1, wherein the act of mechanically coupling the lens pin to the lens base comprises an act of curing ultraviolet curing adhesive to cause the lens pin and the lens base to adhere to one another.

9. The method as recited in claim 1, wherein the act of mechanically coupling the lens pin to the lens base comprises fixing the position of lens in one dimension of a three dimensional coordinate system and wherein an act of mechanically coupling the lens base to the molded package comprises fixing the position of the lens base relative to the molded package in second and third dimensions of the three dimensional coordinate system.

10. The method as recited in claim 1, wherein the act of realigning the lens base and the molded package in the second and third directions comprises realigning the lens base relative to the molded package in second and third dimensions of a three dimensional coordinate system subsequent to fixing the position of the lens pin relative to the molded package in a first dimension of the three dimensional coordinate system.

11. The method as recited in claim 1, wherein the act of realigning the lens base and the molded package in the second and third directions comprises realigning the lens base relative to the molded package in second and third dimensions of a three dimensional coordinate system to compensate for thermal movement caused by fixing the position of the lens pin relative to the molded package in a first dimension of the three dimensional coordinate system.

12. The method as recited in claim 1, wherein the act of mechanically coupling the lens base to the molded package comprises laser welding the lens base to the molded package.

13. The method as recited in claim 1, wherein the act of mechanically coupling the lens pin to the lens base comprises an act of curing ultraviolet curing adhesive to cause the lens base and the molded package to adhere to one another.

14. The method as recited in claim 1, further comprising an act of holding a first lens base surface of the lens base in mechanical contact with a surface of a molded package prior to aligning the lens pin, the lens base, and the molded package.

15. The method as recited in claim 14, further comprising an act of sliding the lens pin at least partially into a receptacle on a second lens base surface of the lens base, the lens pin sliding in the first direction, the first direction being perpendicular to the second lens base surface, the first lens base surface and the second lens base surface being different surfaces.

16. The method as recited in claim 1, further comprising:
an act of aligning a second lens pin, the lens base, and the molded package in the first direction, the second direction, and the third direction such that the signal strength of optical signals transferred between a second lens included in the second lens pin and the molded package is optimized; and
prior to realigning the lens base and the molded package in the second and third directions, an act of mechanically coupling the second lens pin to the lens base to fix the position of the second lens pin relative to the molded package in the first direction.

17. A method for assembling optical components, the method comprising:
an act of aligning one or more lens pins, a dual receptacle base, and a molded package along first, second, and third axes of a three dimensional coordinate system such that the signal strength of optical signals transferred between lenses included in the lens pins and components included in the molded package is optimized, a transmit lens pin being aligned with a laser included in the molded package and a receive lens pin being aligned with a photo detector in the molded package;
an act of mechanically coupling the transmit lens pin and the receive lens pin to the dual receptacle lens base to fix the position of corresponding transmit and receive lenses relative to the molded package along the first axis;
subsequent to mechanically coupling the lens pins to the dual receptacle lens base, an act of realigning the dual receptacle lens base and the molded package along the second and third axes such that the signal strength of transmitted optical signals is optimized; and
an act of mechanically coupling the dual receptacle lens base to the molded package to fix the position of the lens dual receptacle lens base relative to the molded package along the second and third axes.

18. A computer program product for use in a component assembly system, the computer program product for implementing a method for assembling optical components, the computer program product comprising one or more computer-readable media having stored thereon instructions, that when executed, cause tooling including in the assembly system to perform the following:
align a lens pin, a lens base, and a molded package in a first direction, a second direction, and a third direction such that the signal strength of optical signals transferred between a lens included in the lens pin and the molded package is optimized;
mechanically couple the lens pin to the lens base to fix the position of the lens relative to the molded package in the first direction;
subsequent to mechanically coupling the lens pin to the lens base, realign the lens base and the molded package in the second and third directions such that the signal strength of optical signals transferred between the lens pin and the molded package is again optimized; and
mechanically couple the lens base to the molded package to fix the position of the lens base relative to the molded package in the second and third directions.

* * * * *